United States Patent
Ruth et al.

(10) Patent No.: US 7,654,079 B2
(45) Date of Patent: Feb. 2, 2010

(54) DIESEL OXIDATION CATALYST FILTER HEATING SYSTEM

(75) Inventors: Michael J. Ruth, Franklin, IN (US);
Michael J. Cunningham, Greenwood, IN (US); Joan M. Wills, Nashville, IN (US); Lyle E. Kocher, Franklin, IN (US)

(73) Assignee: Cummins, Inc., Columbus, IN (US)

( * ) Notice: Subject to any disclaimer, the term of this patent is extended or adjusted under 35 U.S.C. 154(b) by 144 days.

(21) Appl. No.: 11/593,722

(22) Filed: Nov. 7, 2006

(65) Prior Publication Data

US 2008/0104945 A1     May 8, 2008

(51) Int. Cl.
*F01N 3/00*     (2006.01)
(52) U.S. Cl. .............................. 60/286; 60/274; 60/278; 60/280; 60/285; 60/605.1; 60/605.2
(58) Field of Classification Search .................. 60/274, 60/278, 280, 285, 286, 295, 297, 299, 300, 60/301, 605.1, 605.2
See application file for complete search history.

(56) References Cited

U.S. PATENT DOCUMENTS

| | | | |
|---|---|---|---|
| 4,222,236 A | 9/1980 | Hegedus et al. | |
| 5,473,887 A | 12/1995 | Takeshima et al. | |
| 5,529,048 A | 6/1996 | Kurihara et al. | |
| 5,531,203 A | 7/1996 | Komatsuda et al. | |
| 5,600,947 A | 2/1997 | Cullen | |
| 5,635,142 A | 6/1997 | Ichiki et al. | |
| 5,743,084 A | 4/1998 | Hepburn | |
| 5,784,879 A | 7/1998 | Dohta et al. | |
| 5,878,567 A | 3/1999 | Adamczyk, Jr. et al. | |
| 5,894,725 A | 4/1999 | Cullen et al. | |
| 5,915,359 A | 6/1999 | Meyer et al. | |
| 5,992,142 A * | 11/1999 | Pott ............................. | 60/274 |
| 6,185,935 B1 | 2/2001 | Dickers et al. | |
| 6,199,372 B1 | 3/2001 | Wakamoto | |
| 6,202,406 B1 | 3/2001 | Griffin et al. | |
| 6,205,773 B1 | 3/2001 | Suzuki | |
| 6,209,515 B1 * | 4/2001 | Gotoh et al. ................. | 123/305 |
| 6,212,884 B1 | 4/2001 | Ohuchi et al. | |
| 6,216,449 B1 | 4/2001 | Strehlau et al. | |
| 6,240,723 B1 * | 6/2001 | Ito et al. ....................... | 60/278 |
| 6,244,046 B1 | 6/2001 | Yamashita | |
| 6,266,957 B1 | 7/2001 | Nozawa et al. | |
| 6,272,848 B1 | 8/2001 | Okude et al. | |
| 6,308,515 B1 | 10/2001 | Bidner et al. | |
| 6,311,482 B1 | 11/2001 | Yamashita | |
| 6,318,075 B1 | 11/2001 | Gunther et al. | |

(Continued)

*Primary Examiner*—Binh Q. Tran
(74) *Attorney, Agent, or Firm*—Krieg DeVault LLP

(57) ABSTRACT

A system, method, and software that rapidly heats a diesel oxidation catalyst unit to an effective operating temperature at engine startup is disclosed. Upon ignition of an engine an electronic control unit is operable to lower a fresh air flow target value to a reduced fresh air flow target value as well as lower a valve opening limit of an exhaust gas recirculation valve to a reduced valve opening limit. The electronic control unit monitors a temperature value of a flow of exhaust entering the diesel oxidation catalyst unit until the temperature value reaches a first predetermined threshold value. After reaching the first predetermined threshold value, the electronic control unit causes the fuel system to set post-injection fueling to a predetermined post-injection fueling value until the temperature value of the flow of exhaust entering the diesel oxidation catalyst unit reaches a second predetermined threshold value.

25 Claims, 3 Drawing Sheets

U.S. PATENT DOCUMENTS

| | | |
|---|---|---|
| 6,327,847 B1 | 12/2001 | Surnilla et al. |
| 6,327,848 B1 | 12/2001 | Poggio et al. |
| 6,345,498 B2 | 2/2002 | Yonekura et al. |
| 6,360,530 B1 | 3/2002 | Robichaux et al. |
| 6,370,868 B1 | 4/2002 | Kolmanovsky et al. |
| 6,374,597 B1 | 4/2002 | Bidner et al. |
| 6,389,802 B1 | 5/2002 | Berger et al. |
| 6,401,454 B2 | 6/2002 | Takano et al. |
| 6,408,620 B2 | 6/2002 | Boegner et al. |
| 6,422,003 B1 | 7/2002 | Ament et al. |
| 6,422,004 B1 * | 7/2002 | Takami et al. ............. 60/285 |
| 6,427,439 B1 | 8/2002 | Xu et al. |
| 6,434,928 B1 | 8/2002 | Manaka |
| 6,438,944 B1 | 8/2002 | Bidner et al. |
| 6,451,602 B1 | 9/2002 | Popoff et al. |
| 6,453,663 B1 | 9/2002 | Orzel et al. |
| 6,453,664 B2 | 9/2002 | Ishii et al. |
| 6,463,733 B1 | 10/2002 | Asik et al. |
| 6,467,259 B1 | 10/2002 | Surnilla et al. |
| 6,477,832 B1 | 11/2002 | Surnilla et al. |
| 6,481,199 B1 | 11/2002 | Bidner et al. |
| 6,487,849 B1 | 12/2002 | Bidner et al. |
| 6,487,850 B1 | 12/2002 | Bidner et al. |
| 6,490,858 B2 | 12/2002 | Barrett et al. |
| 6,490,860 B1 | 12/2002 | Farmer et al. |
| 6,497,092 B1 | 12/2002 | Theis |
| 6,502,387 B1 | 1/2003 | Asik et al. |
| 6,502,391 B1 | 1/2003 | Hirota et al. |
| 6,513,319 B2 | 2/2003 | Nozawa et al. |
| 6,513,322 B2 | 2/2003 | Ohuchi et al. |
| 6,531,099 B1 | 3/2003 | Held |
| 6,562,753 B2 | 5/2003 | Miyoshi et al. |
| 6,568,177 B1 | 5/2003 | Surnilla |
| 6,581,372 B2 * | 6/2003 | Sasaki et al. ............. 60/278 |
| 6,588,205 B1 | 7/2003 | Kumagai et al. |
| 6,594,990 B2 | 7/2003 | Kuenstler et al. |
| 6,615,577 B2 | 9/2003 | Meyer et al. |
| 6,644,021 B2 | 11/2003 | Okada et al. |
| 6,651,422 B1 | 11/2003 | LeGare |
| 6,688,101 B2 | 2/2004 | Isobe et al. |
| 6,766,642 B2 | 7/2004 | Binder et al. |
| 6,792,346 B2 | 9/2004 | Takebayashi et al. |
| 6,813,879 B2 | 11/2004 | Watner et al. |
| 6,813,882 B2 | 11/2004 | Hepburn et al. |
| 6,823,658 B2 | 11/2004 | Kuroda et al. |
| 6,823,664 B2 | 11/2004 | Nakatani et al. |
| 6,823,665 B2 | 11/2004 | Hirota et al. |
| 6,829,888 B2 | 12/2004 | Kuenstler et al. |
| 6,871,492 B2 | 3/2005 | Huynh et al. |
| 6,889,497 B2 | 5/2005 | Schnaibel et al. |
| 6,901,749 B2 | 6/2005 | Hashimoto |
| 6,907,862 B2 * | 6/2005 | Kitahara ............. 123/434 |
| 6,941,748 B2 | 9/2005 | Pott et al. |
| 6,962,045 B2 | 11/2005 | Kitahara et al. |
| 6,990,799 B2 | 1/2006 | Bidner et al. |
| 7,121,086 B2 | 10/2006 | Nishii et al. |
| 7,134,274 B2 | 11/2006 | Asanuma |
| 2001/0007191 A1 | 7/2001 | Ohuchi et al. |
| 2001/0010149 A1 | 8/2001 | Ishii et al. |
| 2001/0013223 A1 | 8/2001 | Boegner et al. |
| 2001/0032456 A1 | 10/2001 | Yonekura et al. |
| 2001/0035008 A1 | 11/2001 | Nozawa et al. |
| 2002/0056268 A1 | 5/2002 | Isobe et al. |
| 2002/0073696 A1 | 6/2002 | Kuenstler et al. |
| 2002/0141908 A1 | 10/2002 | Miyoshi et al. |
| 2002/0170287 A1 | 11/2002 | Hirota et al. |
| 2002/0178716 A1 | 12/2002 | Hpeburn et al. |
| 2002/0189235 A1 | 12/2002 | Meyer et al. |
| 2002/0189580 A1 | 12/2002 | Surnilla et al. |
| 2003/0000205 A1 | 1/2003 | Lewis et al. |
| 2003/0037541 A1 | 2/2003 | Farmer et al. |
| 2003/0056497 A1 | 3/2003 | Kuenstler et al. |
| 2003/0056499 A1 | 3/2003 | Binder et al. |
| 2003/0101713 A1 | 6/2003 | Betta et al. |
| 2003/0106306 A1 | 6/2003 | Nakatani et al. |
| 2003/0106307 A1 | 6/2003 | Okada et al. |
| 2003/0131591 A1 | 7/2003 | Pott et al. |
| 2003/0134425 A1 | 7/2003 | Ceccarini et al. |
| 2003/0177761 A1 | 9/2003 | Wagner et al. |
| 2003/0212484 A1 | 11/2003 | Takebayashi et al. |
| 2003/0213235 A1 | 11/2003 | Kitahara et al. |
| 2004/0003587 A1 | 1/2004 | Sakai |
| 2006/0137327 A1 | 6/2006 | Shirakawa et al. |

* cited by examiner

DIESEL OXIDATION CATALYST FILTER HEATING SYSTEM

BACKGROUND

The present invention relates generally to exhaust treatment for an internal combustion engine and more particularly, but not exclusively, to a method, system, and software utilized to rapidly achieve an effective operating temperature of a diesel oxidation catalyst unit after engine startup.

The Environmental Protection Agency ("EPA") is working aggressively to reduce pollution from new, heavy-duty diesel trucks and buses by requiring them to meet tougher emission standards that will make new heavy-duty vehicles up to 95% cleaner than older vehicles. Emission filters in the exhaust gas systems of internal combustion engines are used to remove unburned soot particles from the exhaust gas and to convert harmful pollutants such as hydrocarbons ("HC"), carbon monoxide ("CO"), and oxides of nitrogen ("$NO_x$") into harmless gases.

Exhaust gas is passed through a catalytic converter that is typically located between the engine and the muffler. In operation, the exhaust gases pass over a large surface area that is coated with a catalyst. A catalyst is a material that causes a chemical reaction to proceed at a usually faster rate without becoming part of the reaction process. The catalyst is not changed during the reaction process but rather converts the harmful pollutants into substances or gases that are not harmful to the environment.

Oxidation catalysts are known for use in treating the exhaust of diesel engines in order to convert gaseous HC and CO pollutants and particles by catalyzing the oxidation of these pollutants to carbon dioxide and water. Before these oxidation catalysts can function properly, the oxidation catalysts need to achieve a minimum operating temperature value. In order to provide for maximum conversion, the minimum temperature value needs to be reached as rapidly as possible following engine start up. Accordingly, there is a need for methods and systems for rapidly achieving an effective operating temperature of oxidation catalysts.

SUMMARY

One embodiment according to the present invention discloses a unique rapid diesel oxidation catalyst heating system for a diesel engine. Other embodiments include unique apparatuses, systems, devices, hardware, software, methods, and combinations of these for rapidly heating emission filter catalysts in a diesel oxidation catalyst unit of an internal combustion engine. Further embodiments, forms, objects, features, advantages, aspects, and benefits of the present invention shall become apparent from the following description and drawings.

DETAILED DESCRIPTION OF ILLUSTRATIVE EMBODIMENTS

Figure 1:
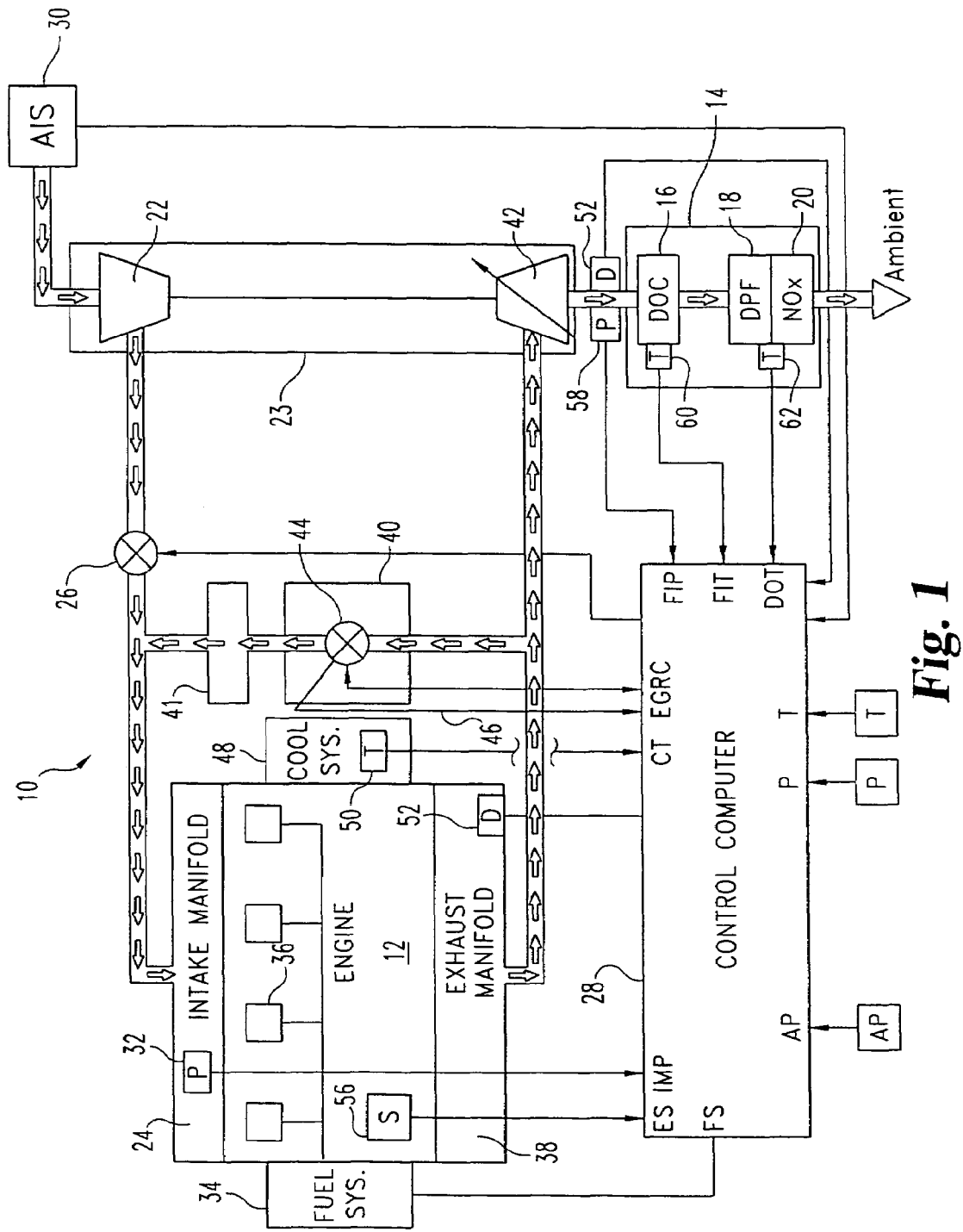
FIG. 1 is a schematic of a representative diesel engine system.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

With reference to FIG. 1, there is illustrated, schematically, a system 10 that includes an internal combustion engine 12 operatively coupled with an exhaust filtration system 14. The exhaust filtration system 14 includes a diesel oxidation catalyst ("DOC") unit 16, a diesel particulate filter ("DPF") 18 and a $NO_x$ adsorber or trap 20. The exhaust filtration system 14 is operable to remove unwanted pollutants from exhaust gas exiting the engine 12 after the combustion process.

The DOC unit 16 is a flow through device that consists of a canister that may contain a honey-comb like structure or substrate. The substrate has a large surface area that is coated with an active catalyst layer. This layer may contain a small, well dispersed amount of precious metals such as, for example, platinum or palladium. As exhaust gas from the engine 12 traverses the catalyst, CO, gaseous HC and liquid HC particles (unburned fuel and oil) are oxidized, thereby reducing harmful emissions. The result of this process is that these pollutants are converted to carbon dioxide and water. In order to function properly, the DOC unit 16 must be heated to a minimum temperature value. During engine startup, when the DOC unit 16 is cold, it needs to be heated to the minimum temperature value by the exhaust gas passing through it before it can function properly.

The DPF 18 may comprise one of several type of particle filters known and used in the art. The DPF 18 is utilized to capture unwanted diesel particulate matter ("DPM") from the flow of exhaust gas exiting the engine 12. DPM is sub-micron size particles found in diesel exhaust. DPM is composed of both solid and liquid particles and is generally classified into three fractions: (1) inorganic carbon (soot), (2) organic fraction (often referred to as SOF or VOF), and (3) sulfate fraction (hydrated sulfuric acid). The DPF 18 may be regenerated at regular intervals by combusting the particulates collected in the DPF 18 through exhaust manipulation or the like. Those skilled in the art would appreciate that, as it relates to the present invention, several different types of DPFs 16 may be utilized in the present invention n.

The $NO_x$ adsorber 20 is operable to absorb $NO_x$ created during the combustion process of the engine 12, thereby reducing the amount of $NO_x$ released into the atmosphere to acceptable levels. The $NO_x$ adsorber 20 contains a catalyst that allows $NO_x$ to adsorb onto the catalyst. The process of adsorption releases carbon dioxide ("$CO_2$"). The $NO_x$ adsorber 20 stores or absorbs $NO_x$ under lean engine operating conditions (lambda>1) and releases and catalytically reduces the stored $NO_x$ under rich engine operating conditions (lambda<1). Under regeneration or when the engine is operating under a rich condition, two reactions happen. First, the catalyst releases the $NO_x$ and is thereby regenerated. Then, the $NO_x$ is reduced to nitrogen ("$N_2$"). The $NO_x$ adsorber 20 also has a high affinity for trapping sulfur and desulfation, the process for removal of sulfur, also requires rich operation, but for a longer period of time and at much higher temperatures.

During engine startup, as well as during normal engine operation, ambient air is inducted from the atmosphere and compressed by a compressor 22 of a turbocharger 23 before being supplied to the engine 12. The compressed air is supplied to the engine 12 through an intake manifold 24 that is connected with the engine 12. An air intake throttle valve 26 is positioned in the fluid path between the compressor 22 and the engine 12 that is operable to control the amount of charge air that reaches the engine 12 from the compressor 22. The air intake throttle valve 26 may be connected with, and controlled by, an electronic control unit ("ECU") 28, but may be controlled by other means as well. For the purpose of the present invention, it is important to note that the air intake throttle valve 26 is operable to control the amount of charge air entering the intake manifold 24 by way of the compressor 22.

An air intake sensor 30 is included either before or after the compressor 22 to monitor the amount of ambient air or charge air being supplied to the intake manifold 24. The air intake sensor 30 may be connected with the ECU 28 and generates electric signals indicative of the amount of charge air flow. An intake manifold pressure sensor 32 is connected with the intake manifold 24. The intake manifold pressure sensor 32 is operative to sense the amount of charge air pressure in the intake manifold 24. The intake manifold pressure sensor 32 is connected with the ECU 28 and generates electric signals indicative of the pressure value that are sent or communicated to the ECU 28.

The system 10 may also include a fuel injection system 34 that is connected with, and controlled by, the ECU 28. The purpose of the fuel injection system 30 is to deliver fuel to the cylinders of the engine 12, while precisely controlling the timing of the fuel injection, the amount of quantity of fuel injected, fuel atomization, as well as other parameters. Fuel is injected into the cylinders of the engine 12 through one or more fuel injectors 36 and combines and is combusted with charge air received from the intake manifold 24. Various types of fuel injection systems may be utilized in the present invention, including, but not limited to, pump-line-nozzle injection systems, unit injector and unit pump systems, rail fuel injection systems and so forth.

Exhaust gases produced in each cylinder during combustion leaves the engine 12 through an exhaust manifold 38 connected with the engine 12. A portion of the exhaust gas is directed to an exhaust gas recirculation ("EGR") system 40 the remaining portion is supplied to a turbine 42. The turbocharger 23 may be a variable geometry turbocharger 23, but other turbochargers may be utilized as well. The EGR system 34 is used to cool down the combustion process by providing a predetermined amount of exhaust gas to the charge air being supplied by the compressor 22. Cooling down the combustion process that occurs in the cylinders of the engine 12 reduces the amount of $NO_x$ produced during the combustion process. An EGR cooler 41 may be included to further cool the exhaust gas before being supplied to the air intake manifold 24 in combination with the compressed air passing through the air intake throttle valve 26.

The EGR system 40 includes an EGR valve 44 this is positioned in fluid communication with the outlet of the exhaust manifold 38 and the air intake manifold 24. The EGR valve 44 may also be connected to the ECU 28, which is capable of selectively or controllably opening and closing the EGR valve 44 or controlling the range or setting at which the EGR valve 44 is opened. The EGR valve 44 may also have incorporated therewith a differential pressure sensor that is operable to sense a pressure change, or delta pressure, across the EGR valve 44. A pressure signal 46 may also be sent to the ECU 28 indicative of the change in pressure across the EGR valve 44.

As set forth above, the portion of the exhaust gas not communicated to the EGR system 40 is communicated to the turbine 42, which rotates by expansion of gases flowing through the turbine 42. The turbine 42 is connected to the compressor 22 and provides the driving force for the compressor 22 that generates charge air supplied to the air intake manifold 24. Some temperature loss in the exhaust gas typically occurs as the exhaust gas passes through the turbine 42. As the exhaust gas leaves the turbine 42, it is directed to the exhaust filtration system 14 where it is treated before exiting the system 10.

A cooling system 48 may be connected with the engine 12. The cooling system 48 is a liquid cooling system that transfers waste heat out of the block and other internal components of the engine 12. Typically, the cooling system 48 consists of a closed loop similar to that of an automobile engine. Major components of the cooling system, most of which are not illustrated but well known in the art, include a water pump, radiator or heat exchanger, water jacket (which consists of coolant passages in the block and heads), and a thermostat. As it relates to the present invention, the thermostat 50, which is the only component illustrated in FIG. 1, is connected with the ECU 28. The thermostat 50 generates a signal that is sent to the ECU 28 that indicates the temperature of the coolant used to cool the engine 12.

The system 10 includes a doser 52 that may be located in the exhaust manifold 38 and/or located downstream of the exhaust manifold 38. The doser 52 may comprise an injector mounted in an exhaust conduit 54. For the depicted embodiment, the agent introduced through the doser 52 is diesel fuel; however, other embodiments are contemplated in which one or more different dosing agents are used in addition to or in lieu of diesel fuel. As set forth below, dosing could occur at a different location from that illustrated. A fuel-rich setting could be provided by appropriate activation of the injectors 36 that provide fuel to the engine 12 in such a manner that the engine 12 produces exhaust including a controlled amount of un-combusted (or incompletely combusted) fuel (in-cylinder dosing or post-injection fueling). Doser 52 is in fluid communication with a fuel line coupled to the same or a different fuel source (not shown) than that used to fuel the engine 12 and is also connected with the ECU 28, which controls operation of the doser 52.

The system 10 also includes a number of sensors and sensing systems for providing the ECU 28 with information relating to the system 10. An engine speed sensor 56 may be included in or associated with the engine 12 and is connected with the ECU 28. The engine speed sensor 56 is operable to produce an engine speed signal indicative of engine rotation speed that is provided to the ECU 28. A pressure sensor 58 may be connected with the exhaust conduit 54 for measuring the pressure of the exhaust before it enters the exhaust filtration system 14. The pressure sensor 58 may be connected with the ECU 28. If pressure becomes too high, this may indicate that a problem exists with the exhaust filtration system 14, which may be communicated to the ECU 28.

At least one temperature sensor 60 may be connected with the DOC unit 16 for measuring the temperature of the exhaust gas as it enters the DOC unit 16. In other embodiments, two temperature sensors 60 may be used, one at the entrance of the DOC unit 16 and one at the exit of the DOC unit 16, for calculating the operating temperature of the DOC unit 16. In this embodiment, an average may be determined, using an algorithm, from the two respective temperature readings of the temperature sensors 60 to arrive at an operating temperature of the DOC unit 16. At least one temperature sensor 62 may be connected with the DPF 18 and/or the $NO_x$ adsorber 20 and the ECU 28. These temperature sensors 62 monitor the operating temperature of the DPF 18 and/or the $NO_x$ adsorber 20 and provide electric signals that are indicative of the operating temperatures to the ECU 28.

Figure 2:
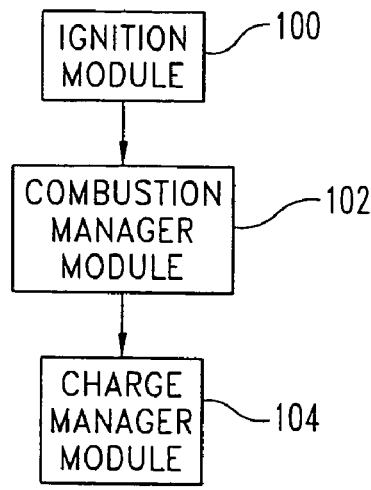
FIG. 2 illustrates software modules executed by a control unit of the diesel engine system illustrated in FIG. 1.

Referring to FIG. 2, the system 10 includes an ignition module or software routine 100, a combustion manager module or software routine 102 and a charge manager module or software routine 104 that are executable by the ECU 28. The ignition module 100 is operable to monitor one or more parameters indicative of the engine 12 being started or that ignition has occurred. The parameters monitored could be chosen from one of several parameters known in the art. For example, the ignition module 100 could use the engine speed reading generated by the engine speed sensor 56 to determine when the engine is started.

Figure 3:
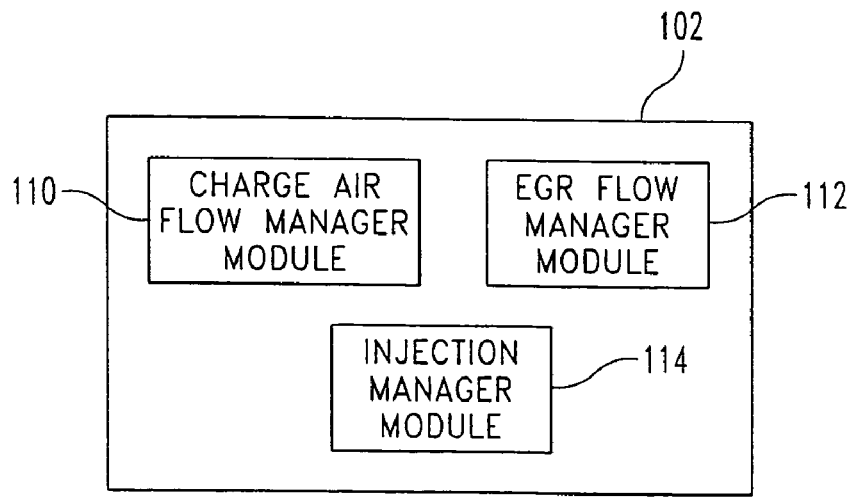
FIG. 3 illustrates software modules of a combustion manager module.

Referring to FIG. 3, the combustion manager module 102 consists of computer executable code that is operable to set target values to manage the combustion process of the engine 12. Depending on the operating condition of the engine 12, for example, startup, idle operation or under various driving conditions, the combustion manager module 102 may set target output values for, amongst other parameters, the amount of charge air flow and EGR flow that is permitted to enter the air intake manifold 24. As such, the combustion manager module 102 may include a charge air flow manager module 110 and an EGR flow manager module 112. For the purpose of the present invention, the target charge air flow supplied by the compressor 22 will hereinafter be referred to as the fresh air flow target ("FAFT"). The manner in which the EGR flow rate is controlled by the EGR system 40 is set forth in detail below.

Figure 4:
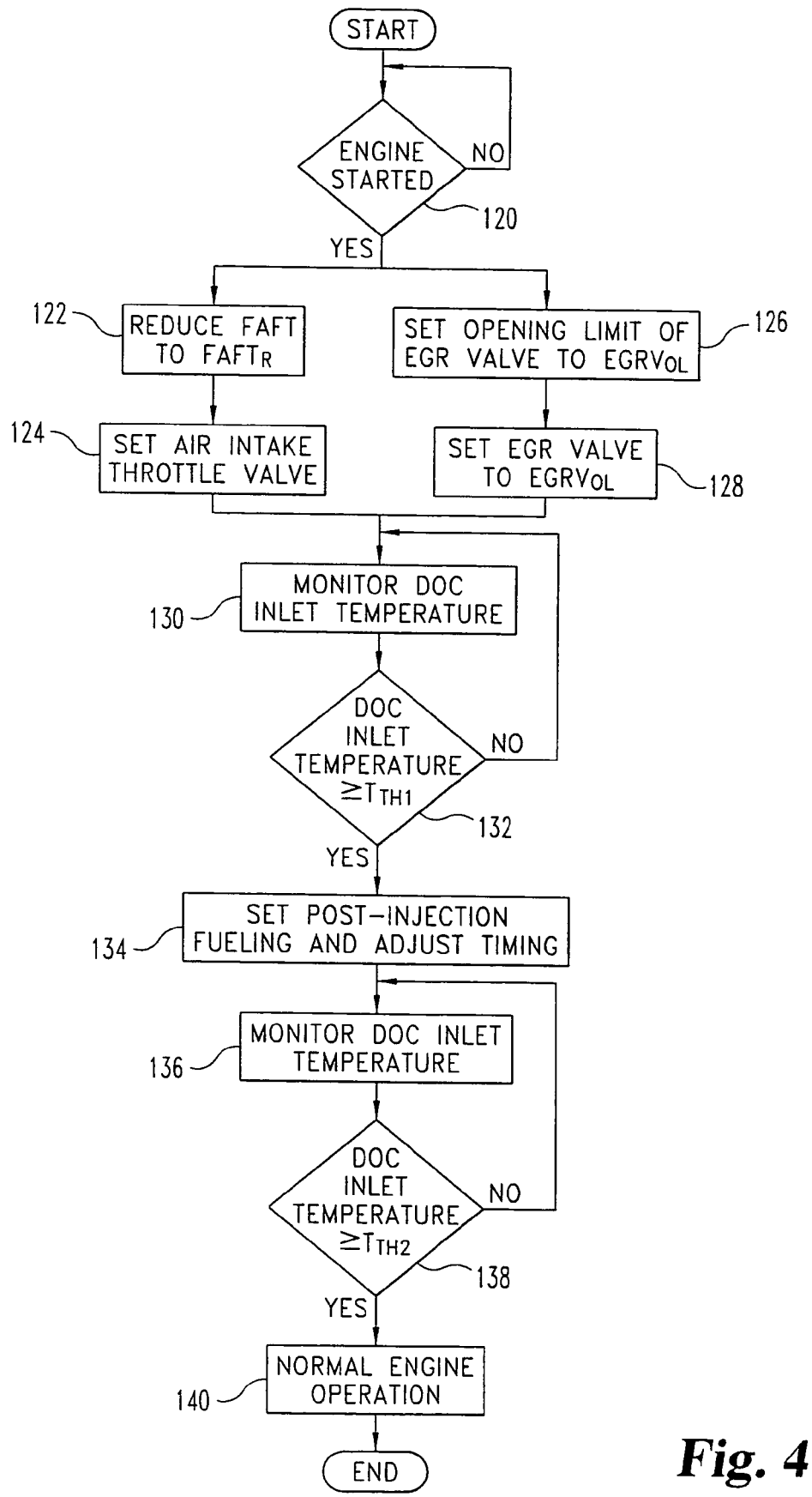
FIG. 4 is a flow chart illustrating representative steps performed by the software modules.

Referring to FIG. 4, once the ignition module 100 detects that the engine 12 has been started (step 120), in order to rapidly heat the DOC unit 16 to a proper operating temperature, the charge air flow manager module 110 sets the FAFT to a reduced target value ("$FAFT_R$"), which is represented at step 122. In one embodiment, $FAFT_R$ is equal to a calibrated value. The calibrated value $FAFT_R$ may vary from engine to engine depending on various parameters such as the size of the engine, the size of the DOC unit 16, and the type(s) of catalyst used in the DOC unit 16, to name a few. The calibrated value $FAFT_R$ may be determined, for example, during laboratory testing of the engine 12 and exhaust filtration system 14 to determine an optimal setting for each particular type of engine 12.

In an alternative embodiment, $FAFT_R$ is determined dynamically as a function of one or more engine operating conditions. For example, $FAFT_R$ may be determined as a function of the coolant temperature ("CT") in the cooling system 48, the engine speed ("RPM"), and a fueling value. As such, in equation form, $FAFT_R$=f(CT, RPM, Fueling) in this embodiment. The temperature of the coolant may be obtained by the ECU 28 from the temperature sensor 50 in the cooling system 48 and the engine speed may be obtained by the ECU 28 from the speed sensor 56. The combustion manager module 102 keeps track of the fueling value.

Once the combustion manager module 102 sets the FAFT to the $FAFT_R$, the charge manager module 104 then sets the air intake throttle valve 26 to an appropriate setting to achieve the $FAFT_R$, which is represented at step 124. As previously set forth, the ECU 28 is connected with the air intake throttle valve 26 and is therefore capable of controlling its respective setting, thereby controlling the amount of fresh or compressed air entering the air intake manifold 22.

In addition, as illustrated in FIG. 4, once the ignition module 100 detects that the engine 12 has started, the EGR flow manager module 112 of the combustion manager module 102 sets an opening limit of the EGR valve 44 to a predetermined lower opening limit ("$EGRV_{OL}$"), which is represented at step 126. In one embodiment, $EGRV_{OL}$ is equal to a calibrated value. The calibrated value $EGRV_{OL}$ may vary from engine to engine depending on various parameters such as the size of the engine, the size of the DOC unit 16, and the type(s) of catalyst used in the DOC unit 16, to name a few. The calibrated value $EGRV_{OL}$ may be determined, for example, during laboratory testing of the engine 12 and exhaust filtration system 14 to determine an optimal setting for each particular type of engine 12.

In an alternative embodiment, $EGRV_{OL}$ is determined dynamically as a function of one or more engine operating conditions. For example, $EGRV_{OL}$ may be determined as a function of the coolant temperature ("CT") in the cooling system 48, the engine speed ("RPM"), and a fueling value. As such, in equation form, $EGRV_{OL}$=f(CT, RPM, Fueling) in this embodiment. The temperature of the coolant may be obtained by the ECU 28 from the temperature sensor 50 in the cooling system 48 and the engine speed may be obtained by the ECU 28 from the speed sensor 56. Once the $EGRV_{OL}$ is determined by the EGR flow manager module 112, the charge manager module 104 sets the EGR valve 44 to the $EGRV_{OL}$. As previously set forth, the EGR valve 44 is connected with the ECU 28, which is operable to, amongst other things, control the positioning (i.e.—the size of the opening) of the EGR valve 44. This allows the ECU 28 to control the amount of exhaust gas recirculated to the air intake manifold 24.

The result of steps 122-128 set forth above, reduces the charge flow supplied to the intake manifold 24, and in turn, the charge flow supplied to the engine 12, which causes the engine 12 to work harder and therefore heat up more rapidly. This also increases the temperature of the exhaust gas. Because the engine 12 heats up faster, the DOC unit 16 likewise heats up faster and therefore reaches its optimum operating temperature quicker instead of over an extended period of time. Quickly warming the DOC unit 16 to its optimum operating temperature reduces the amount of harmful pollutants that are expelled from the exhaust filtration system 14.

The ECU 28 may use the temperature sensor 60 of the DOC unit 16 to continuously monitor, or monitor at predetermined time intervals, the temperature of the exhaust gas as it enters the DOC unit 16, which is represented at step 130. At step 132, when the inlet temperature of the exhaust gas entering the DOC unit 16 reaches a first calibrated threshold temperature value ("$T_{TH1}$"), post-injection fueling commands are modified or initiated, as set forth in detail below. Referring to FIG. 3, the combustion manager module 102 includes an injection manager module 114. The injection manager module 114 is operable to generate signals that are sent by the ECU 28 to the fuel system 34, thereby controlling the injection of fuel by the injectors 36. As previously set forth, the fuel system 34 controls how and when fuel is injected into the cylinders of the engine 12 by the fuel injectors 36 and is controlled by the ECU 28.

During engine operation, fuel is injected by the fuel injectors 36 into the cylinder of the engine 12, where it mixes with charge air in the cylinder that is supplied to the engine 12 through the air intake manifold 24, and once this mixture is placed under a predetermined amount of compression by the piston of the engine 12, combustion of the fuel/charge air mixture occurs thereby producing energy that drives the piston and other related components. As set forth above, after combustion has occurred in the cylinder of the engine 12, fuel may also be injected into the cylinder during the exhaust cycle (i.e.—as the combusted material exits the cylinder through the exhaust manifold 52). The process of injecting fuel into the cylinders of the engine 12 with the fuel injectors 36 after combustion has occurred in the cylinder is referred to herein as "post-injection fueling".

Referring to FIG. 4, as previously set forth, when the inlet temperature of the exhaust gas entering the DOC unit 16 reaches a first calibrated threshold temperature value ("$T_{TH1}$"), post-injection fueling commands are modified or initiated by the ECU 28. In particular, once the exhaust gas temperature of the DOC unit 16 reaches or exceeds $T_{TH1}$, at step 134, the injection manager module 114 instructs the fuel system 34 to set post-injection fueling to a predetermined calibrated level. If post-injection fueling is currently not enabled, the injection manager module 114 causes the fuel system 34 to begin post-injection fueling at the predetermined calibrated level. If post-injection fueling is currently enabled, this step results in setting or increasing the current post-injection fueling level to the calibrated level. The amount or quantity of fuel injected during the post-injection fueling process is calibrated to a predetermined level that is designed to produce an optimal quantity of optimal-length HCs.

In alternative embodiments of the present invention, the injection manager module 114 may also instruct the fuel system 34 to adjust a timing value associated with post-injection fueling to affect the length of the HCs. The timing value relates to the time post-injection fueling occurs after combustion occurs in the cylinder of the engine 12. The goal of step 134 is to adjust post-injection quantity, and optionally timing, to produce an optimal quantity of optimal-length HCs. It has been found that unburned HCs raise the temperature of the DOC unit 16 faster. The extent of post-injection fueling and/or timing varies from engine to engine and application to application, and the optimal settings may be determined by experimentation with each particular engine design.

After step 134 is accomplished, the ECU 28 uses the temperature sensor 60 of the DOC unit 16 to monitor the temperature of the exhaust gas as it enters the DOC unit 16, which is represented at step 136. At step 138, when the inlet temperature of the exhaust gas entering the DOC unit 16 reaches a second calibrated threshold temperature value ("$T_{TH2}$"), where $T_{TH2} > T_{TH1}$, fueling is reset to a normal or regular operating setting, the FAFT value is returned to a normal or regular operating value ("$FAFT_R$"), and the EGR system 40 is returned to a normal or regular operating setting or position. As such, once $T_{TH2}$ is reached, the ECU 28 returns the engine 12 to a normal operating mode or condition as the DOC unit 16 has achieved a high enough temperature to begin effectively removing harmful pollutants.

In another embodiment, step 134 above may be replaced by using one or more of the dosers 52 to inject fuel or another substance into the exhaust flow to increase the amount of HCs in the exhaust gas flowing to the DOC unit 16. In yet another embodiment, both the dosers 52 and step 134 as described above may be used simultaneously. In either embodiment, the amount of fuel introduced by the doser(s) 52 during engine startup is a calibrated value determined on an application by application basis depending on several factors. The system 10 disclosed above is operable to rapidly heat the diesel oxidation catalyst unit 16 to an effective operating temperature so that it may perform its filtering functions in an optimum manner.

As set forth and described in detail above, in one form, the present invention discloses a method of rapidly heating a diesel oxidation catalyst unit 16 to an effective operating temperature. The method includes detecting ignition of an engine 12, lowering a fresh air target value associated with the engine 12 to a reduced fresh air target value, lowering an exhaust gas recirculation valve opening limit to a reduce exhaust gas recirculation opening limit, monitoring a temperature value associated with a flow of exhaust entering the diesel engine oxidation catalyst unit 16, post-injecting a predetermined quantity of fuel once the flow of exhaust exceeds a first calibrated threshold temperature value, and setting the engine 12 to a normal operation mode once the flow of exhaust exceeds a second calibrated threshold temperature value.

Another aspect of the present invention discloses an electronic control unit product for use with an engine. The electronic control unit 28 comprises an electronic control unit usable medium having computer readable program code embodied in the medium for rapidly heating a diesel oxidation catalyst unit 16 to an effective operating temperature at engine startup. The electronic control unit product has computer readable program code for setting a fresh air target value to a reduced value thereby reducing an amount of charge air supplied to the engine 12, computer readable program code for setting an exhaust gas recirculation valve 44 to a reduced opening limit thereby reducing an amount of exhaust gas recirculated to the engine 12, computer readable program code for obtaining a temperature value associated with a flow of exhaust entering the diesel oxidation catalyst unit, computer readable program code for post-injecting a predetermined quantity of fuel once the flow of exhaust exceeds a first calibrated threshold temperature value, and computer readable program code for setting the engine 12 to a normal operating mode once the flow of exhaust exceeds a second calibrated threshold temperature value.

Yet another aspect of the present invention discloses a system comprising an engine 12 in fluid communication with a diesel oxidation catalyst unit 16, a fuel system 34 connected with the engine 12 controllably operable to inject fuel into the engine 12 at predetermined intervals, an electronic control unit 28 connected with the fuel system 34, means for detecting starting of the engine 12, means for reducing charge air flow supplied by a compressor 22 and an exhaust gas recirculation system 40 to the engine 12, means for determining when a flow of exhaust entering the diesel oxidation catalyst unit 16 reaches a first threshold temperature value, means for post-injecting a predetermined quantity of fuel into the engine 12 after combustion occurs in the engine once the flow of exhaust reaches the first threshold temperature value, and means for returning the engine 12 to normal operation once the flow of exhaust reaches a second threshold temperature value.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
a compressor and an exhaust gas recirculation valve for communicating charge air to an intake manifold of an engine;
a fuel system connected with the engine for selectively providing fuel to the engine;
a diesel oxidation catalyst unit in fluid communication with an exhaust manifold connected with the engine for receiving a flow of exhaust gas;
a temperature sensor for obtaining a temperature value of the flow of exhaust gas entering the diesel oxidation catalyst unit;
an electronic control unit connected with the exhaust gas recirculation valve, the fuel system, and the temperature sensor; and
wherein upon ignition of the engine the electronic control unit is operable to lower a fresh air flow target value to a reduced fresh air flow target value and lower a valve opening limit of the exhaust gas recirculation valve to a reduced valve opening limit, wherein said electronic control unit monitors the temperature value of the flow of exhaust entering the diesel oxidation catalyst unit until the temperature value reaches a first predetermined threshold value and upon reaching said first predetermined threshold value causes the fuel system to set post-injection fueling to a predetermined post-injection fueling value until the temperature value of the flow of exhaust entering the diesel oxidation catalyst unit reaches a second predetermined threshold value.

2. The system of claim 1, wherein the electronic control unit returns the engine to a base operation mode once the flow of exhaust entering the diesel oxidation catalyst reaches the second predetermined threshold value.

3. The system of claim 1, further comprising an air intake throttle valve for controlling a flow of air from the compressor.

4. The system of claim 1, wherein the reduced fresh air flow target value is a calibrated value.

5. The system of claim 1, wherein the reduced fresh air flow target value is determined as a function of an engine coolant temperature value, an engine speed value, and a fueling value.

6. The system of claim 1, wherein the reduced exhaust gas recirculation valve opening limit is a calibrated value.

7. The system of claim 1, wherein the reduced exhaust gas recirculation valve opening limit is determined as a function of an engine coolant temperature value, an engine speed value, and a fueling value.

8. The system of claim 1, further comprising a doser in fluid communication with the flow of exhaust gas for dosing the flow of exhaust gas.

9. The system of claim 1, wherein the post-injection fueling value is a predetermined calibrated value.

10. The system of claim 1, wherein the electronic control unit adjusts the timing of post-injection fueling and the post-injection fueling quantity to generate an optimal quantity of optimal-length hydrocarbons.

11. A method, comprising the steps of:
detecting ignition of an engine;
lowering a fresh air target value associated with the engine to a reduced fresh air target value immediately following detection of ignition of said engine;
lowering an exhaust gas recirculation valve opening limit to a reduced exhaust gas recirculation opening limit immediately following detection of ignition of said engine;
monitoring a temperature value associated with a flow of exhaust entering a diesel engine oxidation catalyst unit;
post-injecting a predetermined quantity of fuel once the flow of exhaust exceeds a first calibrated threshold temperature value;
returning the engine to a base operation mode once the flow of exhaust exceeds a second calibrated threshold temperature value.

12. The method of claim 11, further comprising the step of adjusting the timing of post-injecting the predetermined quantity of fuel to achieve optimal-length hydrocarbons in the flow of exhaust.

13. The method of claim 11, wherein the predetermined quantity of fuel is calculated as a function of forming optimal-length hydrocarbons in the flow of exhaust.

14. The method of claim 11, further comprising the step of controlling the amount of compressed air supplied by a compressor with an air intake throttle valve.

15. The method of claim 11, wherein the reduced fresh air flow target value is a calibrated value.

16. The method of claim 11, wherein the reduced fresh air flow target value is determined as a function of an engine coolant temperature value, an engine speed value, and a fueling value.

17. The method of claim 11, wherein the reduced exhaust gas recirculation valve opening limit is a calibrated value.

18. The method of claim 11, wherein the reduced exhaust gas recirculation valve opening limit is determined as a function of an engine coolant temperature value, an engine speed value, and a fueling value.

19. The method of claim 11, further comprising the step of dosing the flow of exhaust gas before entering the diesel oxidation catalyst unit.

20. An electronic control unit product for use with an engine, comprising:
an electronic control unit usable medium having computer readable program code embodied in the medium for rapidly heating a diesel oxidation catalyst unit to an effective operating temperature at engine startup, said electronic control unit product having:
computer readable program code for setting a fresh air target value to a reduced value thereby reducing an amount of charge air supplied to the engine immediately following engine startup;
computer readable program code for setting an exhaust gas recirculation valve to a reduced opening limit thereby reducing an amount of exhaust gas recirculated to the engine immediately following engine startup;
computer readable program code for obtaining a temperature value associated with a flow of exhaust entering the diesel oxidation catalyst unit;
computer readable program code for post-injecting a predetermined quantity of fuel once the flow of exhaust exceeds a first calibrated threshold temperature value; and
computer readable program code for setting the engine to a normal operating mode once the flow of exhaust exceeds a second calibrated threshold temperature value.

21. The electronic control unit product of claim 20, wherein the reduced value is a calibrated value.

22. The electronic control unit product of claim 20, wherein the reduced value is calculated as a function of an engine speed value, a coolant temperature value, and a fueling value.

23. The electronic control unit product of claim 20, wherein the predetermined quantity of fuel is a calibrated value.

24. The electronic control unit product of claim 20, wherein the predetermined quantity of fuel is calculated as a function of an engine speed value, a coolant temperature value, and a fueling value.

25. A system, comprising:
- an engine in fluid communication with a diesel oxidation catalyst unit;
- a fuel system connected with the engine controllably operable to inject fuel into the engine at predetermined intervals;
- an electronic control unit connected with the fuel system;
- means for detecting starting of the engine;
- an air intake throttle valve for reducing charge air flow supplied by a compressor to the engine immediately following detection of starting of the engine and an exhaust gas recirculation valve for reducing an amount of exhaust gas supplied to the engine immediately following detection of starting of the engine;
- a temperature sensor connected with said electronic control unit for determining when a flow of exhaust entering the diesel oxidation catalyst unit reaches a first threshold temperature value;
- means for post-injecting a predetermined quantity of fuel into the engine after combustion occurs in the engine once the flow of exhaust reaches the first threshold temperature value; and
- where said engine is returned to base operation once the flow of exhaust reaches a second threshold temperature value.

* * * * *